United States Patent [19]

Hanson

[11] 4,354,690
[45] Oct. 19, 1982

[54] SUPPORT SYSTEMS FOR VEHICLE MUD FLAPS

[76] Inventor: Marlyn S. Hanson, 13822 W. Warren Dr., Lakewood, Colo. 80228

[21] Appl. No.: 169,161

[22] Filed: Jul. 15, 1980

[51] Int. Cl.³ .............................................. B62D 25/16
[52] U.S. Cl. .............................................. 280/154.5 R
[58] Field of Search .................. 280/154.5 R; 211/96; 248/289.1

[56] References Cited

U.S. PATENT DOCUMENTS

| | | | |
|---|---|---|---|
| 1,706,887 | 3/1929 | Knostman | 211/96 |
| 2,471,342 | 5/1949 | Nelson | 248/289.1 |
| 3,183,877 | 5/1965 | Benzel | 248/289.1 |
| 3,388,884 | 6/1968 | Eggler et al. | 280/154.5 R |
| 3,632,137 | 1/1972 | Jossy | 280/154.5 R |
| 3,782,757 | 1/1974 | Juergens | 280/154.5 R |
| 3,934,901 | 1/1976 | Hammgroy | 280/154.5 R |
| 4,007,944 | 2/1977 | Dingess | 280/154.5 R |
| 4,074,884 | 2/1978 | Antoszewski | 248/289.1 |

*Primary Examiner*—David M. Mitchell
*Attorney, Agent, or Firm*—Donald W. Margolis

[57] ABSTRACT

A mud flap system for vehicles including a substantially L-shaped rod to carry a mud flap and a rigid bracket to receive said rod is described. The bracket is preferably substantially unitary in structure and includes a substantially vertical socket through which one leg of the L-shaped rod is inserted. It also includes a support portion spaced from and at a distance from the socket on which the other (horizontal) leg of the rod rests. This latter portion both supports the horizontal leg and dampens vertical oscillations of the leg. A pair of substantially rigid side walls carried by the bracket provide a nesting area for at least a portion of the horizontal leg to limit its lateral motion. The bracket thus provided serves to simultaneously secure one leg of the L-shaped rod in its vertical socket and to thus provide cantilevered support to the second (horizontally) extending leg, while the side walls limit the lateral movement of the horizontal leg and the spaced support provides horizontal support while also dampening vertical oscillation of the horizontal leg. In one preferred embodiment, additional resilient dampening material is included in the bracket in contact with the horizontal leg to further cushion said leg and dampen its vertical oscillation.

7 Claims, 5 Drawing Figures

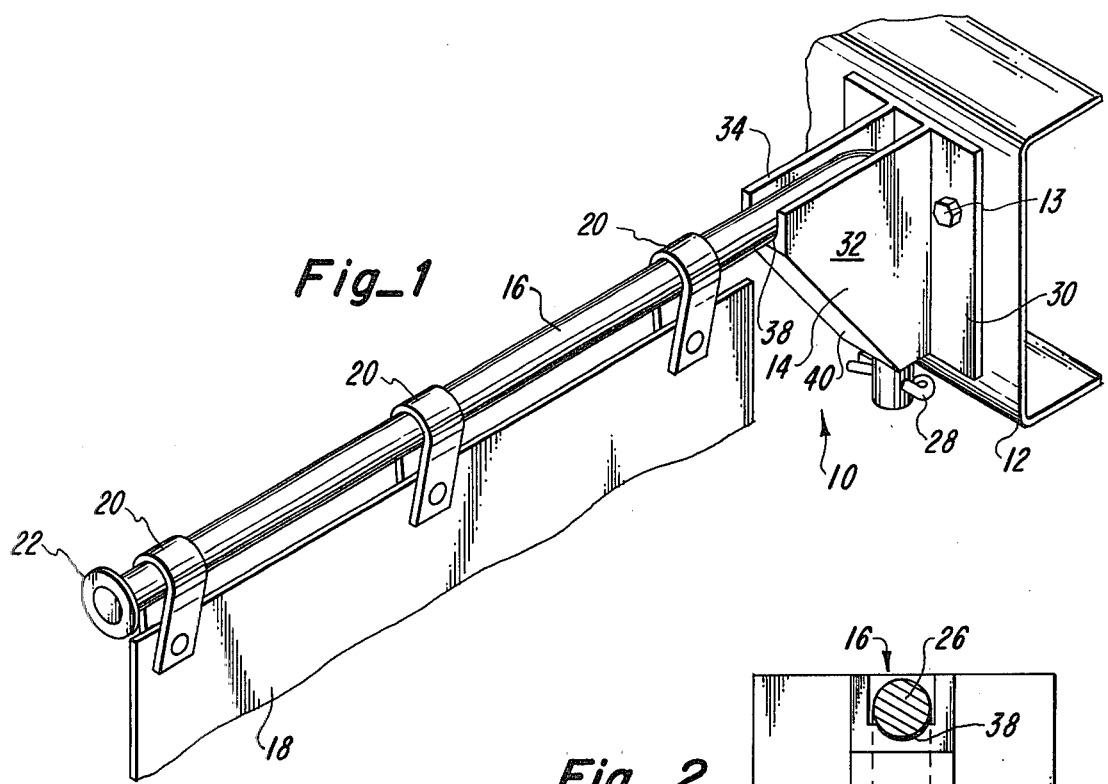
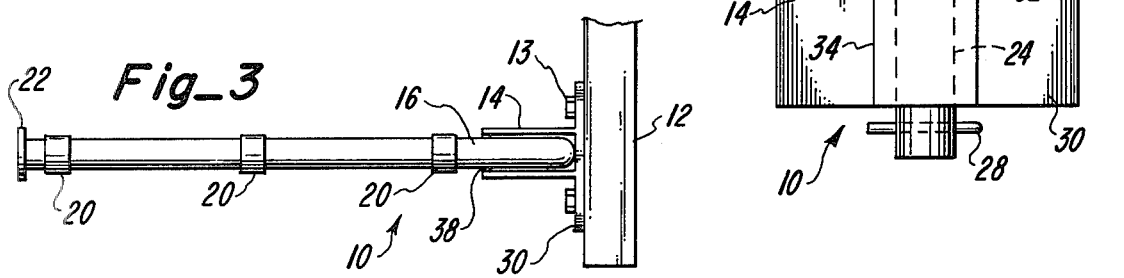
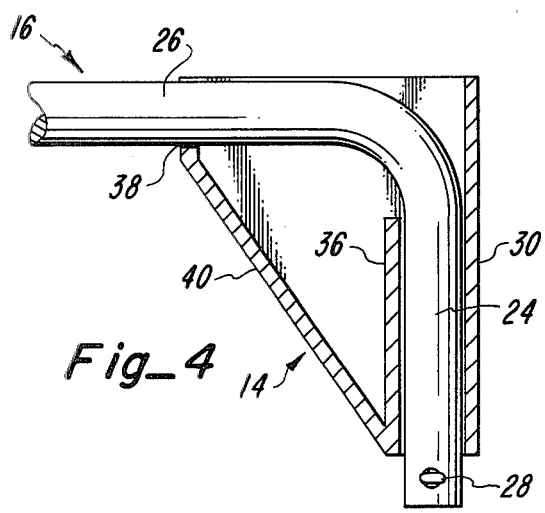
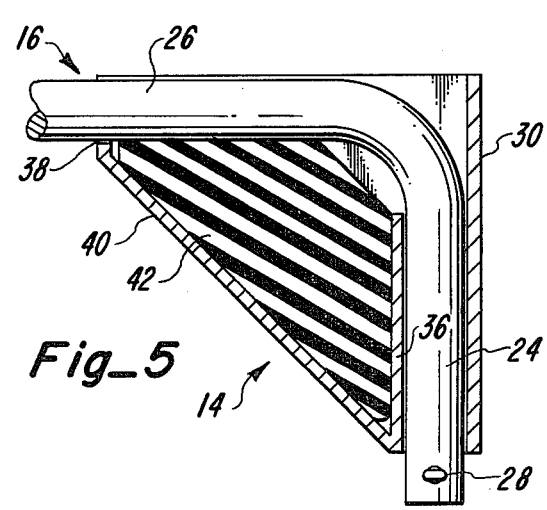

SUPPORT SYSTEMS FOR VEHICLE MUD FLAPS

BACKGROUND OF THE INVENTION

1. Field of the Invention

This invention relates to land vehicle attachments in the form of dust, mud and splash guards. More specifically it relates to combined interlocking brackets and supports for the attachment of mud flaps to vehicles.

2. Description of the Prior Art

Many land vehicles utilize flexible mud flaps mounted behind the wheels to protect other vehicles on the highway from dust, mud, water, gravel and other debris thrown rearwardly by the vehicle's wheels. In many instances, especially for trucks, such devices are required by state law to protect following vehicles from damage and from loss of vision which can occur due to materials thrown into the air behind the traveling vehicle. In some instances these mud flaps have been more or less permanently fixed to the frame. Other mud flap systems are designed or constructed so as to include easily removable or replaceable support rod systems for attachment to a bracket on the vehicle.

Because of their location and the manner in which they are utilized, such mud flap assemblies have commonly been subject to rapid destruction or deterioration. When they are located at the very rear of the vehicle, they are often subject to bending and breaking damage when the vehicle is backed into a parking or loading dock area. Additionally, on the road, due to the bouncing and pitching of the vehicle to which they are attached, mud flap support rods are subjected to continual oscillation which causes flexing at or near the vehicle attachment point. This constant flexing results in metal fatigue in the rods, which in turn causes them to break or to be easily subjected to breaking, often after only a short period of service. Even in replaceable systems, the cost of replacement rods and the labor involved is substantial.

This problem has been attacked in the prior art in several ways. In some instances, efforts have been made merely to provide an easily replaceable support system, without any concern for the cost of the broken rod assembly and the labor required to replace it. In other systems, various means to provide resiliency in the support rod itself, for example, by the use of a cantilevered structure in the support rod or by forming a spring-like structure of the support rod itself, or by providing resilient lateral support adjacent to the rod have been utilized. However, in all known commercial applications, the problem of premature breakage of support rods, due to both mechanical damage and road shock has resulted in short-lived support rod systems. Prior art of interest includes U.S. Pat. Nos. 3,388,884; 3,782,757; 3,934,901; and 4,007,944; the art cited therein, and the classes in which they are classified.

None of the known prior art structures approaches the rod breakage problem in replaceable support systems by providing a simple, composite support bracket for a support rod, which support bracket simultaneously provides a vertical socket to receive one leg of a simple, inexpensive L-shaped rod, a spaced extension to support and dampen oscillations in the horizontal leg of the rod, and rigid lateral nesting means surrounding the horizontal leg of the support rod. Such a bracket structure is essentially incorporated in the present invention, and by this means the invention is found to completely alleviate the deficiencies of the prior art, both in theory and in practice, by means of a simple, efficient and economical system.

SUMMARY OF THE INVENTION

In carrying out the principals of the present invention, as shown in the following detailed description of preferred embodiments, a bracket support for a mud flap rod support assembly is provided. The bracket support is preferably a rigid unitary structure and includes an upwardly opening socket through which one leg of an L-shaped rod may be inserted, a support spaced from the socket at a location at which it will intersect and support the horizontal leg of the rod, and a pair of rigid sidewalls to provide a snug nesting area for the horizontal leg of the L-shaped support rod. It is thus seen that the bracket so provided serves to simultaneously secure the vertical leg of the L-shaped support rod, provide cantilevered support for the horizontal leg of the rod, provide additional support and dampening for the horizontal leg at a distance from the socket, and limit lateral movement of the rod by the location of the rigid sidewalls. The bracket thus provides substantial resistance to movement of the support leg in all degrees of motion. It is theorized that this limitation of movement is responsible for avoiding metal fatigue in the support rod as it travels with the vehicle along the highways, thus allowing the rod to retain its natural strength and resiliency.

Additionally, the support bracket of the present invention apparently provides sufficient additional support so that when the support rod is subjected to direct mechanical shock or impact, the bracket either absorbs a major portion of the shock, thus avoiding damage to the rod, or any portion of the system. If bent, the rod remains sufficiently flexible and resilient to avoid breakage and allow repair by the simple expedient of mechanically, if crudely, straightening the rod and/or support bracket.

In a second preferred embodiment of the present invention, a resilient member is inserted into the nesting area provided by the two side plates. Such a resilient member apparently provides additional shock absorption and rod dampening to the bracket system, thus further limiting or avoiding metal fatigue in the rod.

It is thus seen, in essence, that the embodiments of the present invention, as compared with the prior art theory and practice, are unique and entirely practical and suitable for commercial application to vehicles. Durability and resistance to fatigue and failure of the mud flap support rod is assured by the invention, which thus also serves to assure the safety of other vehicles sharing the highway with a vehicle utilizing the support system of the present invention. The excellent support, resilience and dampening characteristics of the bracket system taught by the present invention apparently solve the problem of metal fatigue in a cantilevered support rod, which problem was not previously thought to be curable in a rigid bracket system.

BRIEF DESCRIPTION OF THE DRAWINGS

The various objects and features of the present invention will be more fully understood from the following detailed description of preferred embodiments and applications thereof, throughout which description reference is made to the accompanying drawings, in which:

FIG. 1 provides an isometric view, including a mud flap partially broken away, of one preferred embodiment of the present invention.

FIG. 2 is an end view, partially in phantom, showing details of the structure of the support bracket of the present invention.

FIG. 3 is a diminished top view of the system of FIGS. 1 and 2.

FIG. 4 is a plan view, partially in section, showing additional details of the structure of the support bracket of the present invention.

FIG. 5 is a plan view, similar to FIG. 4, showing one modification of the support bracket of the present invention, wherein additional resilient means are provided for the support rod within the support bracket.

DETAILED DESCRIPTION OF PREFERRED EMBODIMENTS

Referring to the drawings in detail, wherein like numerals designate like parts throughout, a mud flap support system, generally 10, is attached, for example to a portion of a truck frame 12, for example by bolts 13. The total support system 10 includes support bracket 14 to which support rod 16 is attached to provide a cantilevered support for mud flap 18. Mud flap 18 is shown to be secured to support 16 by a series of straps 20, the mud flap being secured against horizontal displacement from the rod by means of removable end cap 22.

Rod 16 consists generally of a first leg 24 and a second leg 26 formed at right angles to one another, generally in the shape of an "L". Rod 16 is secured within bracket 14 by means of cotter pin 28.

Referring now in more detail to bracket 14, it is found that bracket 14 includes a generally flat back plate 30, designed for placement on a to-be-mounted surface, from which back plate 30, a pair of rigid side walls 32 and 34 extend at about a 90° angle, side walls 32 and 34 being spaced from one another about the diameter of the socket. Spaced from back plate 30 and bridging a portion of the space between side walls 32 and 34 is socket wall 36. Together, a portion of back plate 30, portions of side walls 32 and 34 and socket wall 36 define what is in use, a substantially vertical socket having an upper opening for receiving and generally securing leg 24 of rod 16. Once leg 24 of rod 16 is seated within the socket, leg 26 is located and receives cantilevered support in a substantially horizontal plane.

Rigid side walls 32 and 34 extend to a height such that when rod 16 is located in the socket, a portion of leg 26 is snugly nested between them. This nesting arrangement thus prevents substantially or limits lateral motion in horizontal leg 26. Finally, support seat 38, bridging a portion of plates 32 and 34 is provided. Seat 38 is located at a distance from the socket such that it provides both vertical support to horizontal leg 26 and substantially dampens the vertical oscillatory motion of leg 26 during vehicle motion. In the preferred embodiment shown, seat 38 is supported by angular brace 40 which also bridges the space between side walls 32 and 34 and provides added strength and rigidity to the entire system.

It is thus seen that bracket 14 of the present invention provides a simple but eloquent structure which combines a small number of elements in combination to provide cantilevered support to leg 26 of L-shaped rod 16, while additionally securing or limiting horizontal portion 26 of rod 16 against vertical and horizontal motion. It is also constructed to substantially dampen vibration of rod 16 on the road, and thus avoid metal fatigue in the rod.

Referring to FIG. 5, one of the many possible alternative embodiments of the present invention are shown. In this embodiment, resilient member 42, for example, of rubber, is sandwiched between walls 32 and 34 in supporting contact with a portion of the underside of horizontal leg 26. Resilient member 42 provides additional dampening and shock absorption to the bracket system of the present invention.

Cork, plastic, silicone, springs or other resilient means can be substituted for rubber 42. It should also be noted that in FIG. 5, seat 38 is at an even greater distance from the socket than the embodiment of FIG. 4. The location of seat 38 is preferably selected to best dampen oscillation of the horizontal leg.

The device of the present invention is simply and easily made. Rod 16 is easily constructed from mild steel having a diameter, for example, of 0.75 inches. In a similar manner bracket 14 is made from 0.25 inch stock mild steel by the steps of, for example, separately stamping base 30, sidewall 32, sidewall 34, and the portion which will be socket wall 36 and brace 40, bending the latter portion at an angle to match the sidewalls, and then welding the four pieces as required. Other means of construction or materials can also be used.

While several embodiments of the present invention have been shown, other modifications are easily provided. For example, side walls 32 and 34 need not be flat, or solid or monolithic, as long as they provide the required lateral support for leg 26 of rod 16. Walls 32 and 34 can extend beyond seat 38. The generally triangular cross-sectional shape of walls 32 and 34 is an engineering expedient which provides great strength with a small amount of materials. However, other configurations for the side plates may be easily substituted, so long as they provide the rigid lateral support required for leg 26. In a similar manner, seat 38 can be supported by walls 32 and 34 and need not be supported by brace 40. More than one seat 38, or a substantially continuous horizontal support can be provided, and would be equivalent.

Also base plate 30 may be in the form of an angle or oriented partially or completely at an angle, or even in a substantially horizontal plane, so long as it provides support for the other elements of the bracket in the required orientation.

While rod 16 is shown to be round in cross-section, square, hex, flat or other rod configurations can function within the brackets and the system of the present invention, with minimal amounts of modification to the bracket.

Furthermore, while in the embodiments shown, rod 16 is a simple, inexpensive L-shape, other rods, having more complex shapes, may be utilized in the systems and with the brackets of the present invention, so long as they ultimately include a substantially vertical portion to be removably secured within the socket of the bracket and a somehow connected portion to provide horizontal support for a mud flap. Any such support rod is intended to be the equivalent of "L-shaped" as used in the present application and claims.

Replaceable flap 18 secured by hangers 20 are generally available as a commercial product. The form of mud flap or mud flap suspension does not in any way provide a limitation upon the present invention. In a similar manner, while bracket 14 is shown as being secured to a vehicle by means of bolts 13, other means of securing the bracket can be utilized. Needless to say, the use of cotter pin 28 to secure rod 16 within bracket 14 is also a simple expedient. Cotter pin 28 allows easy location and removal of rod 16 within bracket 14, however other means of securing the rod 16 within the socket of bracket 14 may be easily substituted for cotter pin 28.

It is thus seen that the present invention provides a simple, easily constructed, and inexpensive rigid mounting bracket for a mud flap system. However, the bracket is very durable and functions in a required manner so that mud flap support rod 16 is limited in its horizontal motion and supported and dampened against vertical vibrations, thus reducing metal fatigue to the rod.

The several advantages of the bracket of the present invention and of the system of the present invention over the prior art should now be apparent without further description.

The terms and expressions which have been employed herein are used as terms of description and not of limitation and there is no intention, in the use of such terms and expressions, of excluding any equivalents of the features shown and described or portions thereof, but it is recognized that various modifications, other than those discussed, are possible within the scope of the invention which is to be limited solely by the appended claims.

What is claimed is:

1. A bracket for mounting a mud flap system on a vehicle, said bracket comprising:
   (a) a base plate adapted for attachement to a vehicle;
   (b) a socket supported by said base plate, said socket extending in a substantially vertical direction and defining an upper opening when said base plate is attached to a vehicle;
   (c) first and second substantially rigid side wall portions secured to said bracket substantially at right angles to said socket, said side wall portions spaced one from another and at a height somewhat higher than said upper opening of said socket; and
   (d) means for providing both support and dampening, said support and dampening means connected between said side wall portions at about the same height as said upper opening of said socket, but spaced from said socket.

2. The system of claim 1 wherein said side wall portions are spaced from one another at a distance approximating the distance across said upper opening of said socket.

3. The system of claim 1 wherein said side wall portions are generally triangular in shape and oriented with one edge generally adjacent the socket and a second edge generally extending from a lower portion of said socket to about said means for providing support and dampening.

4. The system of claim 1 or 3 wherein said side walls extend to form a portion of said socket.

5. The system of claim 3 wherein means for bracing said bracket are connected between said side walls at edges extending from about the lower portion of said socket to about the area of the means for providing support and dampening.

6. The system of claim 1 wherein said mud flap system includes a support rod, and in which additional means for resiliently dampening said support rod is located between said side wall portions in the area intermediate said support and dampening means and said socket.

7. A mud flap system for a vehicle including, in combination, a mud flap, an L-shaped support means adapted to carry said mud flap and including first and second legs which are substantially at right angles to one another, and a bracket adapted for receipt of said support means, wherein the improvement comprises a bracket including:
   (a) a base plate adapted for attachment to a vehicle;
   (b) a socket supported by said base plate, said socket extending in a substantially vertical direction and defining an upper opening when said base plate is attached to a vehicle;
   (c) first and second substantially rigid side wall portions secured to said bracket substantially at right angles to said socket, said side wall portions spaced one from another and at a height somewhat higher than said upper opening of said socket; and
   (d) means for providing both support and dampening, said support and dampening means connected between said side wall portions at about the same height as said upper opening of said socket, but spaced from said socket, whereby when a first leg of an L-shaped support means is inserted into said substantially vertical socket, the second leg of said support means is provided cantilevered support in a substantially horizontal plane, is nested between said rigid side wall portions, and is located in proximity with said support and dampening means, so that when in use with a moving vehicle, lateral and vertical motion of said horizontal leg is limited and dampened, thus avoiding fatigue in said support means.

* * * * *